Patented Nov. 17, 1931

1,832,218

UNITED STATES PATENT OFFICE

GEORG KALISCHER, OF FRANKFORT-ON-THE-MAIN, AND FERDINAND BIEHLER, OF FECHENHEIM, NEAR FRANKFORT-ON-THE-MAIN, GERMANY, ASSIGNORS TO GENERAL ANILINE WORKS, INC., OF NEW YORK, N. Y., A CORPORATION OF DELAWARE

PROCESS FOR THE PRODUCTION OF ACID AND LIME RESISTING DERIVATIVES OF UNSATURATED FATTY ACIDS

No Drawing. Application filed December 9, 1927, Serial No. 238,989, and in Germany December 24, 1926.

In U. S. application of Ferdinand Münz Serial No. 88,460, filed February 15, 1926, there is described a process for the production of new derivatives of unsaturated fatty acids which are resistant to acids and not precipitated by calcareous water, which process consists in acting with sulfuric anhydride on unsaturated fatty acid compounds.

This process produces very good results, but its technical performance has the disadvantage, that, when starting from hydroxyfatty acids one is compelled to use a great excess of fuming sulfuric acid. A further disadvantage of this process consists in the high viscosity of the reaction mass, caused by the use of big quantities of fuming sulfuric acid, a fact which leads to difficulties when working up the mass.

Now we have found an improved process which avoids the aforesaid disadvantages and permits the use of a smaller quantity of the sulfonating agent. Our process consists in acting on unsaturated hydroxyfatty acid compounds with fuming sulfuric acid with the addition of a low fatty acid compound.

Under the term "low fatty acid compound" we understand lower fatty acids and their substitution products, particularly acetic acid, chloroacetic acid, as well as their anhydrides or esters or mixtures of them; under the term "unsaturated hydroxyfatty acid compounds" we include unsaturated hydroxyfatty acids themselves as well as their anhydrides and polymerization products and their esters, particularly ricinoleic acid and among its derivatives castor oil.

The process of sulfonation gives particularly favourable results if at first the low fatty acid compound is allowed to react on fuming sulfuric acid and then the unsaturated hydroxyfatty acid compound is subjected to the action of the reaction mixture containing for instance acetylsulfuric acid, when having used an acetic acid compound. This mode of performance involves the advantage, that the sulfonation mass can be always well stirred, that the mixture becomes wholly homogeneous and therefore the sulfonation process can be carried out, without especially cooling the mass, at ordinary or even at moderately elevated temperatures.

The reaction products thus obtained, which are related in their character and sphere of application to the products obtainable according to the process of Münz, are distinguished from them by their higher degree of purity, shown by a remarkable transparent color and an increased resistance towards acids, lime and magnesia. This fact is important as regards their use for technical purposes. According to the results of our investigations the difference of our products from those of Münz, appearing especially when using a reaction mixture containing acetylsulfuric acid, seems to be based on the following: The acetyl-sulfuric acid has not only the effect of a diluent for the mass to be sulfonated, but it takes part in the reaction and therefor the acetyl residue is present in the products of reaction, entirely or in part in a chemical combination.

In order to further illustrate our invention the following examples are given, the parts being by weight and all temperatures in centigrade degrees. But we wish it to be understood, that we are not limited to the particular conditions nor to the specific products mentioned therein.

Example 1

100 parts of castor oil are mixed with 30–40 parts of glacial acetic acid and to the mixture at about 0°, slowly and while well cooling, at first 40 to 60 parts of fuming sulfuric acid of about 27% and 16 parts of acetic acid anhydride and then again about 50 parts of fuming sulfuric acid of 27% are added. The mass is stirred, until a test shows the desired degree of sulfonation. Then it is poured on icewater, to which advantageously sodium sulfate is added. The dilute aqueous solution thus obtained is neutralized with caustic soda solution and evaporated to the desired concentration. After cooling down the crystallizing salts are removed by filtration. In this manner the sulfonation product is obtained as a clear brownish oil, corresponding in its properties to the products, described in U. S.

application 88,840, but distinguished by an essentially more transparent color.

*Example 2*

50 parts of fuming sulfuric acid of 25–30% are allowed to run into a mixture of 100 parts of castor oil and 40 parts of glacial acetic acid. When the reaction is finished the mass is poured on icewater, advantageously with addition of sodium sulfate, whereby two layers are formed. The upper layer which contains the sulfofatty acid derivative is taken off, neutralized with caustic soda solution and the solution is eventually evaporated to 300 parts by weight. The crystallizing salts are removed and then a clear yellowish oil remains of similar properties as the product obtained according to Example 1.

When replacing castor oil by the corresponding amount of free hydroxyfatty acids or of their anhydrides in the same manner analogous products are formed closely related in their properties with the products obtained according to the foregoing examples.

*Example 3*

40 parts of glacial acetic acid are added to 100 parts of fuming sulfuric acid of about 30% and the mixture is allowed to run at 20–40° while stirring into 100 parts of castor oil. The mass is worked up as described in Example 2. In this manner a yellowish oil of an especial clearness is obtained, similar in its properties to the products obtained according to the foregoing examples.

*Example 4*

At temperatures below 50° a mixture of 20 parts of acetic acid anhydride and 20 parts of glacial acetic acid is caused to react on 150 parts of fuming sulfuric acid of 15% and then the reaction mass, containing acetylsulfuric acid, is slowly introduced at 20–40° into 100 parts of castor oil. The mass is worked up as described in Example 2. A clear yellowish oil is obtained.

We claim:

1. Improved process for the production of acid and lime resisting derivatives of unsaturated fatty acids which process comprises acting on unsaturated hydroxyfatty acid compounds with fuming sulfuric acid with addition of an anhydrous low fatty acid compound.

2. Improved process for the production of acid and lime resisting derivatives of unsaturated fatty acids, which process comprises acting on unsaturated hydroxyfatty acid compounds with a reaction mixture obtained by mixing an anhydrous low fatty acid compound with fuming sulfuric acid.

3. As new compounds sulfonation products being strongly hygroscopic substances, viscous liquids in form of their concentrated aqueous solutions, resisting to acids and not precipitated by calcareous water, which products are obtainable by acting on unsaturated hydroxyfatty acid compounds with a reaction mixture, obtained by mixing an anhydrous low fatty acid compound with fuming sulfuric acid.

4. As new compounds sulfonation products being strongly hygroscopic substances, viscous liquids in form of their concentrated aqueous solutions, resisting to acids and not precipitated by calcareous water, which products are obtainable by acting on castor oil with a reaction mixture, obtained by mixing an anhydrous low fatty acid compound with fuming sulfuric acid.

5. The process of sulfonating fats and oils which are composed in part of unsaturated hydroxy fatty acids, which comprises reacting such material with a reagent containing free sulfur trioxide in the presence of an anhydrous low fatty acid compound.

6. The process of sulfonating castor oil which comprises reacting said oil with a reagent containing free sulfur trioxide in the presence of an anhydrous low fatty acid compound.

In testimony whereof, we affix our signatures.

GEORG KALISCHER.
FERDINAND BIEHLER.